United States Patent [19]

Solomon et al.

[11] 3,836,796

[45] Sept. 17, 1974

[54] SEMICONDUCTOR PRESSURE TRANSDUCER EMPLOYING NOVEL TEMPERATURE COMPENSATION MEANS

[75] Inventors: James E. Solomon, Saratoga; Arthur R. Zias, Palo Alto, both of Calif.

[73] Assignee: National Semiconductor Corporation, Santa Clara, Calif.

[22] Filed: Sept. 24, 1973

[21] Appl. No.: 400,355

[52] U.S. Cl................. 307/310, 307/308, 219/209, 357/26
[51] Int. Cl...................... H03k 23/22, H03k 23/08
[58] Field of Search .......... 307/308, 310; 219/209; 73/88 SD; 317/235, 26

[56] References Cited
UNITED STATES PATENTS

| | | | |
|---|---|---|---|
| 3,395,265 | 7/1968 | Weir | 307/310 |
| 3,531,655 | 9/1970 | Taylor | 307/310 X |
| 3,641,372 | 2/1972 | Green et al. | 307/310 |
| 3,666,973 | 5/1972 | Hulsman | 307/310 |

OTHER PUBLICATIONS
Force Transducer; IBM Technical Disclosure Bulletin; K. H. Stokes et al.; Vol. 7, No. 12, May 1965, pg. 1225.

Pressure Sensor Electronic Converter; by J. A. Collins, IBM Technical Disclosure Bulletin, Vol. 9, No. 3, August 1966, pp. 333–334.

Primary Examiner—Andrew J. James
Attorney, Agent, or Firm—Harvey G. Lowhurst

[57] ABSTRACT

A semiconductor pressure transducer having a cavity with one thin wall diaphragm on which a piezoresistive bridge is formed of four resistors diffused into the thin wall semiconductor diaphragm and coupled together as a Wheatstone bridge, a voltage regulator including a zener diode coupled to the bridge, and a pair of $nV_{BE}$ circuits coupled to the bridge and the regulator circuit for temperature compensation of the bridge and regulators over the operating temperature range, each of said $nV_{BE}$ circuits comprising a transistor and two associated resistors connected so as to provide an irrational number of $V_{BE}$ voltage drops for temperature compensation.

3 Claims, 6 Drawing Figures

SEMICONDUCTOR PRESSURE TRANSDUCER EMPLOYING NOVEL TEMPERATURE COMPENSATION MEANS

BACKGROUND OF THE INVENTION

Pressure transducers have been built utilizing semiconductor integrated circuitry. One such pressure transducer is described in an article entitled "Integration Brings a Generation of Low Cost Transducers" by A. Zias and W. Hare in "Electronics," Dec. 4, 1972, pages 83 to 88. The pressure transducer of the absolute pressure type comprises a 12 mil thick silicon chip having an 11 mil thick N+ type substrate and a 1 mil thick N epitaxial layer grown on the surface of the substrate. A vacuum reference cavity is formed in one portion of the chip by etching into the backside of the thick substrate to leave the thin wall diaphragm of the 1 mil thick N epitaxial layer.

This chip is bonded while under a vacuum to a backplate of silicon 12 mils thick, forming a pressure tight vacuum reference cell, the silicon pressure diaphragm forming one wall thereof, A Wheatstone bridge arrangement of four piezoresistors is formed in the thin silicon diaphragm, the four resistors being formed by a P diffusion of boron into the N epitaxial layer grown on the silicon chip.

A constant voltage is applied to the pair of input nodes of the bridge, and the voltage output, which is linearly dependent on the pressure applied to the thin diaphragm to unbalance the bridge, is measured at the output node points of the bridge. As the pressure rises, the output voltage rises and thus serves as a measure of this pressure on the sensor, i.e., the resistor bridge on the semiconductor diaphragm.

In addition to the Wheatstone bridge, a temperature compensation circuit comprising a plurality of series connected PN junction diodes is also formed in the N epitaxial layer of the silicon chips. As the temperature of operation of the Wheatstone bridge changes, a change of about 1,200 ppm/°C occurs in the bridge resistors, and gives an error in the output voltage. The series diodes are coupled in the circuit to the bridge from the applied voltage source to produce a voltage change with temperature change that compensates for the bridge resistor temperature induced changes and for the change of resistance due to pressure's temperature sensitivity, the combined change comprising Span Temperature Compensation (TC).

The Span TC temperature compensation comprising the plurality of diodes does not perform well since the chain is made up of a rational number of diode voltage ($V_{BE}$) drops, whereas an irrational number of diode drops may be required to more accurately temperature compensate the bridge.

Also, a voltage regulator is employed for the bridge input and comprises a zener diode coupled across the bridge. The voltage across the zener diode is also temperature dependent and a temperature compensation circuit is needed to temperature compensate the zener diode.

SUMMARY OF THE PRESENT INVENTION

The present invention provides a temperature compensation circuit for the Wheatstone bridge resistors forming the sensor of a silicon chip type pressure transducer device, this temperature compensation circuit providing an irrational number of $V_{BE}$ diode voltage drops so that the Wheatstone bridge may be more correctly temperature compensated. This temperature compensation circuit comprises a transistor with its emitter-collector circuit connected in series between the applied voltage source and the bridge input thermally well coupled to the bridge, and a pair of resistors connected in series across the emitter-collector circuit whose ratio remains constant with temperature change, with the junction node between the resistors coupled to the base of the transistor. By selecting the proper ratio between the two resistor values, the $V_{BE}$ voltage drop provided by the transistor may be a desired irrational number.

A similar temperature compensation circuit is used to temperature compensate the zener diode voltage regulator.

DESCRIPTION OF THE PREFERRED EMBODIMENTS

Figure 1:
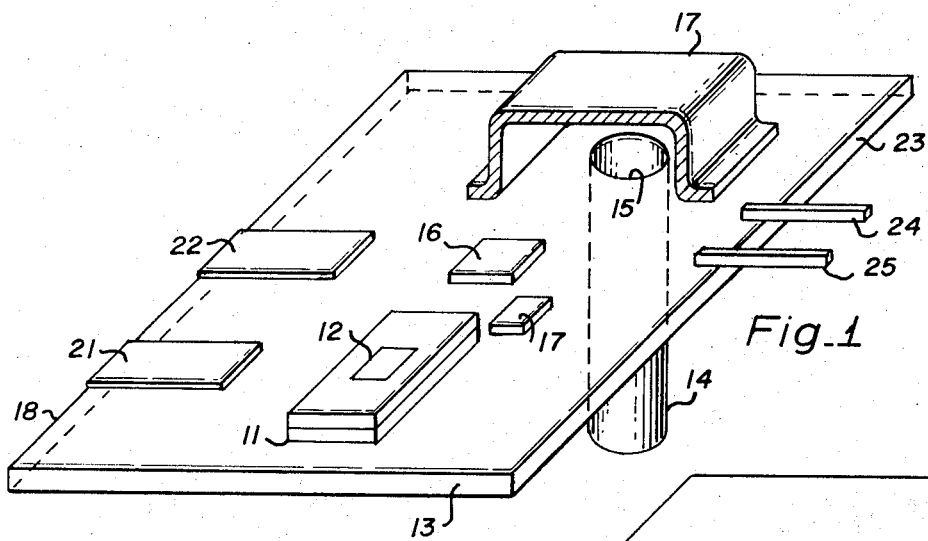
FIG. 1 is a perspective view of the pressure transducer apparatus incorporating the present invention.

FIG. 1 illustrates the pressure transducer of the present invention including a semiconductor pressure sensor structure 11 having a piezoresistive bridge 12 formed by the P diffusion of four resistor arms into the N epitaxial layer grown on an N+ substate. The pressure sensor structure is affixed to a ceramic plate. A pressure tube connector 14 is sealed to the under side of the plate 13 and over an opening 15 in the plate 13 leading to the sensor region. The ceramic plate also has affixed thereto a buffer amplifier 16 (a 747 operating at unity gain) and a 741 operational amplifier 17 that raises the output signal received from the bridge 12 via the buffer amplifier 16 to the desired output level. A typical output voltage range is 2.5 to 12.5 voltage for a pressure range from 0 to 30 psi.

The region of the plate 13 including the pressure tube hole 15 and the sensor structure 11 is covered by and sealed under a suitable metal cover 17. A number of thick film, trimmable resistors are positioned along one edge 18 of the ceramic plate 13 and outside of the evacuated cover region. Only two such resistors 21 and 22 are illustrated. Input and output terminal leads are positioned along the other edge 23 of the plate; only two such leads 24 and 25 are illustrated.

Figure 2:
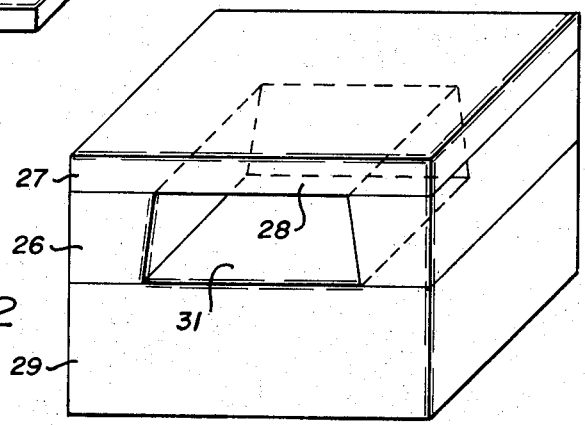
FIG. 2 is a cross sectional view taken through the cavity portion of the semiconductor body included in the device of FIG. 1 showing the thin flexible diaphragm wall of the cavity.

In FIG. 2 there is shown a cross sectional view taken through the semiconductor body 11 which includes a N+ type substrate 26 about 11 mils thick in which a 1 mil thick N type epitaxial layer 27 is grown. The N+ type material 26 under a central region of the wafer 26 is etched away to serve as the reference cavity, leaving only the 1 mil thick N epitaxial layer 27 in this region to serve as the diaphragm 28. Portions 26, 27, 28 are of one single crystal of silicon. This upper semiconductor body portion 26, 27, 28 is then sealed with a suitable bonding material under vacuum to a second semiconductor chip 29 which forms a backing plate for the upper semiconductor chip 26, 27, 28. Where the pressure transducer is to serve as a gage device rather than an absolute pressure transducer, a hole is made through the backing chip 29 and extending into the cavity region 31 to expose the cavity region under the diaphragm 28 to the local ambient pressure. It should be noted that the structure shown is not drawn to scale; the semiconductor body including the top portion 26, 27, 28 and the backing chip is about 0.115 × 0.165 inch and about 24 mils thick. The cavity dimensions are about 11 mils thick and 0.060 × 0.115 inch. It should also be noted that all the above processes are performed upon a wafer or slice containing hundreds of said devices at once.

Figure 3:
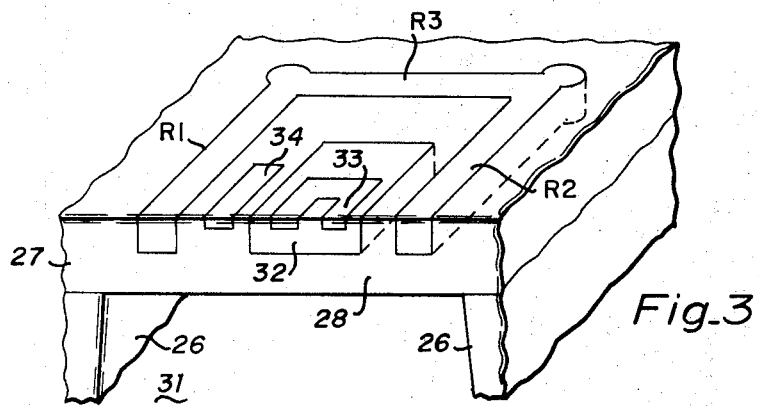
FIG. 3 is a view similar to FIG. 2 showing a portion of the piezoresistive bridge circuit diffused into the thin wall diaphragm as well as a transistor circuit formed within the bridge circuit on the diaphragm.

There is shown in FIG. 3 an enlarged cross section view of the 1 mil thick N epitaxial layer 27 forming the pressure sensor diaphragm 28 and illustrating three of the four resistors (R1, R2, R3, and R4) forming the four arms of this piezoresistive bridge circuit 12 on the diaphragm 28. These resistors are formed by P type diffusion, e.g., boron, in the N epitaxial layer. There is also shown formed within the boundaries of the bridge 12 a transistor Q1 comprising a P diffused base 32, an N+ diffused emitter region 33, and an N+ type collector connector 34 diffusion serving to connect with the common collector region of the transistor formed by the N epitaxial layer.

Figure 4:
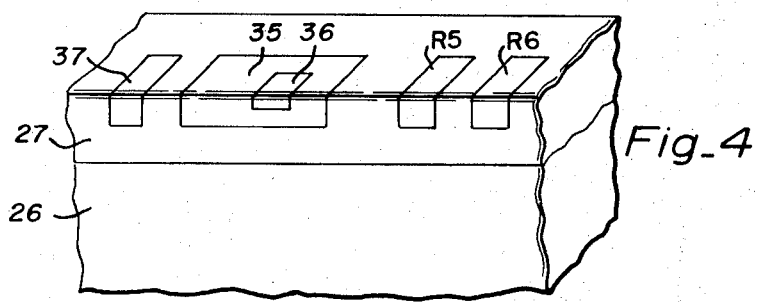
FIG. 4 is a cross section view of another portion of the semiconductor body showing another transistor structure and two diffused resistors formed in the semiconductor body.

FIG. 4 illustrates another portion of the semiconductor chip structure 11 spaced from the cavity region 31, said other portion having a transistor Q2 formed in the N epitaxial layer 27 comprising a P diffused base region 35, an N+ emitter region 33, and an N+ collector connector region 34 coupling to the common collector N epitaxial layer 27. Two P diffused resistors R5 and R6 are also shown formed in the N epitaxial layer 27.

Figure 5:
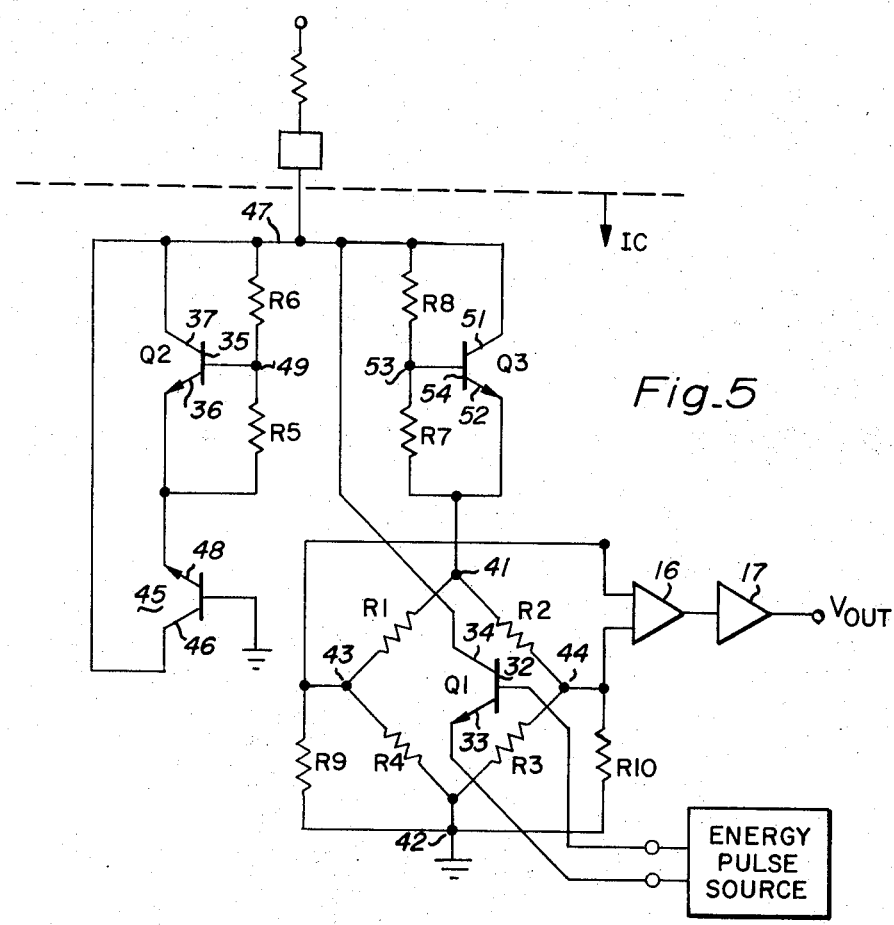
FIG. 5 is a schematic diagram illustrating the novel temperature compensation circuits employed with the zener diode voltage regulator circuit and with the piezoresistive bridge circuit of the semiconductor pressure transducer.

The schematic diagram of the piezoresistive bridge and associated circuitry is shown in FIG. 5 and comprises the four equal value diffused resistors R1-R4 coupled at the corners as shown to form a four piezoresistor arm bridge circuit with a voltage input coupled across the bridge at input node 41 and grounded input node 42. The two output nodes 43 and 44 of the bridge lead to the output circuit including the 747 buffer amplifier 16 and the 741 operational amplifier 17.

This circuit also includes a voltage regulator circuit for the bridge comprising the zener diode 45, formed by the reverse biased emitter-base junction of a standard NPN transistor such as formed in the N epitaxial layer. This zener diode is formed in the same manner as the two transistors Q1 and Q2, and all of these devices have a common collector formed by the N epitaxial layer on the chip; the collector 46 of the zener diode is thus shown coupled to the common collector node 47. For a typical device, the zener diode has a breakdown voltage of approximately 6.5V, and with this breakdown characteristic, it has associated with it a positive temperature coefficient of about + 2.5 mv/°C.

It is desired that the applied voltage regulated by this zener diode 45 and appearing as the applied voltage on the common collector node 47 be maintained constant over the operating temperature range of the device, from for example −40°C to +125°C. The zener diode is therefore provided with a temperature compensation circuit comprising an $nV_{BE}$ network including the transistor Q2 having its emitter 36 coupled to the emitter 48 of the zener diode and its collector 37 coupled to the common collector node 49. A pair of resistors R5 and R6 comprising the two P diffused resistors in the N epitaxial layer 27 are connected in series between the common collector node 47 and the emitter 48 of transistor Q2, with the junction node 49 between the two resistors R5 and R6 coupled to the base 35 of the transistor Q2. This $nV_{BE}$ network thus consists of the transistor Q2, resistor R5, and resistor R6 with a value of $(n_1-1)R5$. Q2 is thermally well coupled to the zener diode 45 so as to properly track its temperature change.

By the proper selection of the value of $n_1$, the circuit produces a negative temperature coefficient (i.e., −2.5 mv/°C) just sufficient to cancel out the positive temperature coefficient of the zener diode 45 over the operating temperature range. A typical value for $n_1$ is 1.25 where $n$ is 0.25, an irrational number. Thus an irrational number of $V_{BE}$ diode drops are provided from this $nV_{BE}$ network to serve as the temperature compensation for the zener diode 45 to maintain the voltage applied at the node 47 constant.

The piezoresistive bridge formed by R1-R4 also has a positive temperature coefficient of about + 1,200 ppm/°C and a second $nV_{BE}$ network comprising the transistor Q3 and two resistors R7 and R8 is provided to balance out this bridge temperature coefficient. This $nV_{BE}$ temperature compensation network comprises a transistor Q3 having its collector 51 coupled to the common collector node 47, at which the applied voltage is held constant by the zener voltage regulator circuit, and its emitter 52 coupled to the voltage input node 41 of the piezoresistive bridge. Two resistors R7 and R8 are connected in series between the applied voltage node 47 and the bridge input node 41, the junction point 53 between the two resistors R7 and R8 being coupled to the base 54 of the transistor Q3. The resistor R8 has a value equal to $(n_2 - 1)R7$ and by a proper establishment of the value of $n_2$, the circuit will produce a temperature coefficient just sufficient to cancel out the Span TC, which is mainly composed of the temperature coefficient of resistance of the bridge. Q3 is thermally well coupled to the piezoresistive bridge to properly track it temperature change. The two resistors R7 and R8 are thick film resistors (such as 21 and 22) located outside the area of the sealed cover 17 on the ceramic plate and they may be adjusted in value during manufacture and test by trimming the resistor with a laser trimming apparatus controlled either manually or by a computer control. As the temperature of the bridge sensor is changed, the output voltage is measured and the thick film resistors are trimmed relative to their ratio until the correct $n_2V_{BE}$ value is obtained to give the desired temperature coefficient for the $nV_{BE}$ network associated with the resistor bridge circuit.

Figure 6:
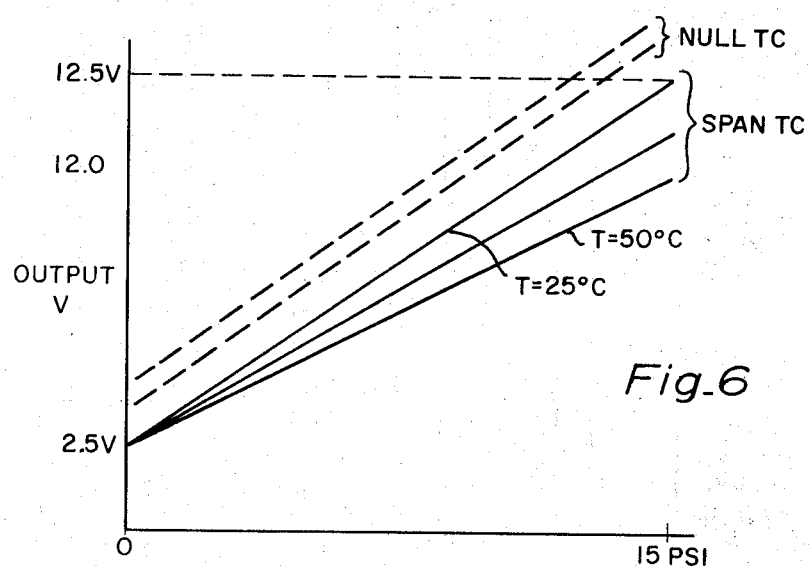
FIG. 6 is a graph illustrating span and null temperature compensation (TC) for the bridge.

This latter adjustment is termed the span temperature compensation (TC) adjust and is illustrated in FIG. 6 which shows a plot of the output voltage V versus the pressure applied to the diaphragm and the effect of the temperature compensation on the results. At a constant temperature of 25°C, the output voltage varies along a slope line from 2.5 volts to 12.5 volts, over a selected pressure range of 0 to 15 psi. The same trace at 50°C shows that the end output voltage is lower, for example, 12.0 volts, and thus indicates a negative temperature coefficient of 500 millivolts at the 50°C value, or a change of 5 percent. By trimming to adjust the ratio of the resistors, R7 and R8, the slope of the span line trace at 50°C may be moved closer to the trace from 2.5V to 12.5V and the output voltage can be made to approach the desired 12.5 volts, with acceptable small deviation over the operating pressure range for all values over the operating temperature range.

In addition to span temperature coefficient, there is a small temperature coefficient that is illustrated by the traces on the graph of FIG. 6 which are parallel dash lines above the trace from 2.5V to 12.5V. The null temperature coefficient shifts the output lines from the desired trace from 2.5V output to 12.5V output to some higher or lower output start and finish value, for example, a 0.3 or 0.5 volts difference. By heating the semiconductor diaphragm and measuring the voltage output, this null temperature coefficient can be measured. The two thick film resistors R9 and R10 coupled across the output nodes 43 and 49 of the bridge to the grounded input node 42 can be adjusted in ratio R9/R10 to bring the null temperature coefficient line down to the desired value extending between the output range from 2.5 volts to 12.5 volts.

During these applied temperature span and null adjustment processes, the transducer apparatus may be placed into a heat chamber and brought up through the desired temperature range. A more preferred method for heating the silicon diaphragm 28 is to incorporate a transistor Q1 on the silicon diaphragm 28 and preferably within the boundaries of the four arm piezoresistor bridge as shown in FIG. 3. The thermal resistance of the very thin diaphragm 28 is about 300°C/watt and the thermal time constant is about 100 milliseconds. Applying an energy pulse to heat the diaphragm simulates placing the device in a heat chamber; however, the desired temperature change is effected in a very short time period. For example, the temperature of the sensor may be raised fro 25°C to 150°C in about 100 milliseconds. The voltage output of the bridge may be measured cold, or at 25°C, and then again measured at the elevated temperature to give the desired temperature range in a short time interval. This is important when manufacturing and calibrating large numbers of devices, particularly where computer controlled laser trimming of the thick film resistors R7, R8, R9, and R10 is employed.

This temperature inducing transistor is shown in FIG. 5 and comprises the base 32 diffused into the N epitaxial layer 27 serving as the common collector, coupled to the collector contact 34, and an emitter 33 diffused in to the base region. The emitter and base are brought out to output leads 56 and 57 which may be employed to receive the energy pulses needed to heat the diaphragm.

What is claimed is:

1. A semiconductor pressure transducer apparatus comprising
    a semiconductor body comprising a substrage and a surface layer of a material of a first conductivity type, said body having a cavity region formed therein, said cavity region including a thin wall section formed by a section of said surface layer, said thin wall section being flexible responsive to pressure exerted across said thin wall section,
    an electrical bridge circuit formed in said thin wall section of said surface layer and comprising four resistor arms, two opposed nodes of said bridge forming a bridge input, the two other opposed nodes of said bridge forming a bridge output, each of said bridge resistors being formed by a diffusion of a dopant of opposite conductivity type to that of the surface layer into said thin semiconductor wall section,
    circuit means for applying a voltage to the input nodes of said bridge circuit, said circuit means including a common collector node formed by said layer of said semiconductor material of said first conductivity type,
    a zener diode formed in said surface layer comprising an emitter, a collector coupled to said common collector node, and a base coupled to one input node of said bridge.
    a temperature compensation circuit for said zener diode comprising
        a first transistor formed in said surface layer having an emitter coupled to the emitter of said zener diode, a base, and a collector coupled to said common collector node, and
        a pair of resistors coupled in series between said common collector node and the emitter of said first transistor, the junction node between said two resistors
    being coupled to the base of said first transistor,
    and a temperature compensation circuit coupled between another input node of said bridge and said common collector node comprising
        a second transistor formed in said surface layer having an emitter coupled to said other bridge input node, a collector coupled to said common collector node, and a base, and
        a pair of resistors coupled in series between said common collector node and the emitter of said second transistor, the junction node between said two resistors being coupled to the base of said second transistor.

2. A semiconductor pressure transducer apparatus as claimed in claim 1 wherein the collectors of said zener diode and said first and second transistors are formed by the surface layer of said second conductivity on said substrate, the base regions of said zener diode and said first and second transistors are formed by diffusions of a material of said opposite conductivity type into said surface layer, and the emitters of said zener diode and said first and second transistors are formed by a diffusion of a material of said first conductivity type into the associated base regions.

3. A semiconductor pressure transducer apparatus as claimed in claim 2 including a ceramic plate on which said semiconductor body is mounted, said pair of resistors in said temperature compensation circuit for said zener diode being formed by the diffusion of regions of a material of said opposite conductivity type into said surface layer of said first conductivity type on said substrate, said pair of resistors on said temperature compensation circuit for said bridge circuit being formed by trimmable thick film resistor material on said ceramic plate.

* * * * *